Nov. 19, 1963   F. JAKOB ETAL   3,111,072
CAMERA WITH ADJUSTABLE LIGHT METER
Filed Dec. 20, 1962

INVENTOR.
FRANZ JAKOB
BY KARL WAGNER

United States Patent Office 3,111,072
Patented Nov. 19, 1963

3,111,072
CAMERA WITH ADJUSTABLE LIGHT METER
Franz Jakob, Unterhaching, near Munich, and Karl Wagner, Munich, Germany, assignors to Agfa Aktiengesellschaft, Leverkusen, Germany
Filed Dec. 20, 1962, Ser. No. 246,106
Claims priority, application Germany, Dec. 30, 1961
10 Claims. (Cl. 95—10)

The present invention relates to cameras and is applicable either to motion picture or to still cameras.

It has already been proposed to provide cameras with a structure which will automatically adjust a light meter of the camera in accordance with the speed of the film which is introduced into the camera. Thus, the cassette in which the film is located or a part of the film strip itself is provided with an actuating portion which may be in the form of a notch, projection, or the like, and this actuating portion is suitably located in accordance with the speed of the film for actuating a transmission when the film is introduced into the camera so as to transmit through the transmission movement to the light meter for automatically adjusting the latter in accordance with the film speed when the film is placed in the camera.

Although structures of the above type have already been proposed, they create certain problems. Thus, it is known that in some cases it is necessary to adjust the light meter in accordance with correction factors in addition to the speed of the film which is used in the camera. For example, where a filter is used with the camera it is necessary to make allowances for the filter factor, and also there are other situations such as situations where there is a strong contrast between the subject which is photographed and the background of the subject, such situations also requiring certain correction factors to be introduced in order to make a proper exposure. Where the light meter is automatically adjusted according to the film speed with a structure of the type referred to above it is not possible to introduce such additional correction factors, and this is of course a serious disadvantage with cameras of the above type.

It is accordingly a primary object of the present invention to provide a camera which on the one hand is capable of having its light meter automatically adjusted according to the film speed and which on the other hand can additionally have its light meter adjusted according to an additional correction factor.

It is a further object of the present invention to provide a structure of this type which is exceedingly simple and compact as well as reliable in operation.

A further object of the present invention is to provide a structure of the above type where the additional correction factor is capable of being manually introduced by the operator without any attention being paid by the operator to the structure for automatically adjusting the light meter according to the film speed.

With these objects in view the invention includes, in a camera, a camera housing which has a film compartment which is adapted to receive a film means which is provided with an actuating portion which is indicative of the film speed. A transmission means is carried by the camera housing and is actuated by the actuating portion of the film means according to the film speed when the film means is introduced into the compartment of the camera housing, and this transmission means is operatively connected to a light meter of the camera which is adjustably carried thereby so that through this transmission means the light meter will be automatically adjusted according to the film speed. The transmission means includes a pair of transmission members one of which is turned from the actuating portion of the film means and the other of which transmits movement to the light meter, this pair of transmission members being located one next to the other so that the motion is transmitted from the one to the other transmission member. A manually releasable connecting means interconnects these transmission members for maintaining them in driving engagement while permitting the operator to move the said other transmission member relative to the said one transmission member for adjusting the light meter independently of actuation of the transmission means by the actuating portion of the film means so as to provide for manual introduction of an additional correction factor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
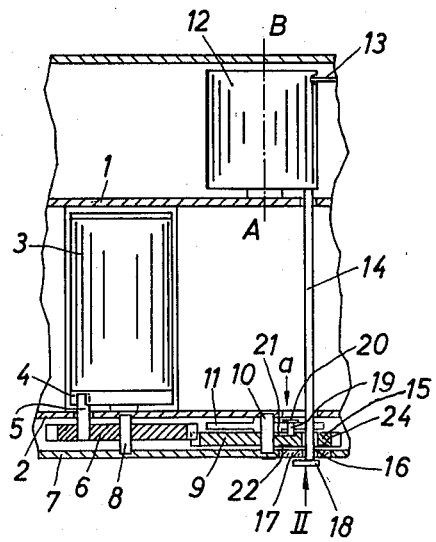
FIG. 1 is a fragmentary sectional elevation of a camera according to the invention, FIG. 1 showing only that part of the camera which is provided with the structure of the invention.
Figure 2:
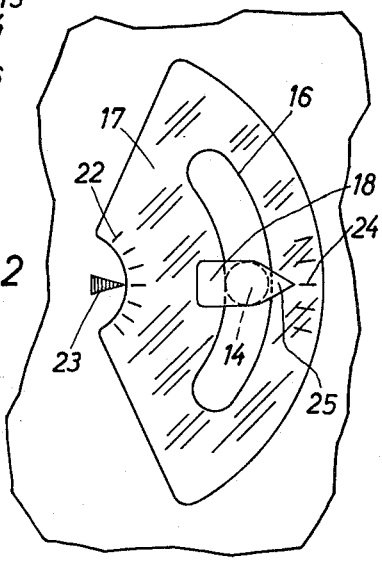
FIG. 2 is a fragmentary view on an enlarged scale of part of the structure of FIG. 1 as seen in the direction of the arrow II, FIG. 2 illustrating a scale arrangement for indicating to the operator settings which are made.

With the construction which is illustrated in FIGS. 1 and 2, the camera housing has a pair of walls 1 and 2 between which is located a film compartment of the camera housing, this film compartment being adapted to receive a film means which in the illustrated form is a strip of film located within the substantially cylindrical cassette 3. The film means is provided with an actuating portion indicative of the speed of the film, and in the illustrated example this actuating portion takes the form of a notch 4 which is formed in the bottom wall of the cassette 3 of the film means, the angular position of the notch 4 being indicative of the film speed. When the cassette 3 of the film means is introduced into the compartment of the camera which is adapted to receive the film means, this cassette 3 will necessarily have a given angular position, and thus the actuating portion 4 will also have a predetermined angular position according to the film speed.

The wall 1 of the camera housing adjustably carries a light meter 12 provided with a pointer 13 which is fragmentarily illustrated. In the illustrated example the light meter 12 is supported by the wall 1 for turning movement so that it can be angularly adjusted, and such angular adjusting movement of the light meter means 12 is preferred inasmuch as such an arrangement requires a minimum amount of space since the light meter will occupy the same space while simply turning angularly about its central axis.

A transmission means is carried by the camera housing and is actuated by the actuating portion 4 of the film means when the latter is introduced into the film compartment so that the transmission means will be actuated according to the film speed, and the transmission means is operatively connected to the light meter means 12 for adjusting the latter automatically according to the film speed. This transmission means includes a rotary gear means 6 which is turnably carried by the camera housing. Thus, it will be seen that the camera housing includes a wall 7 which forms the bottom wall of the camera and which is located beneath the wall 2 thereof to define a given space therewith, and between the walls 2 and 7 extends a pin 8 of the camera housing, this pin 8 supporting the gear 6 for rotary movement, and the gear 6 carries a pin 5 which extends through an arcuate slot of the wall 2 into the film-receiving compartment of the camera housing. When the film means is introduced into the film-receiving compartment the actuating portion 4 of the film means will receive the pin 5 and will turn the latter so as to locate the pin 5 of the rotary gear means at an angular position determined by the film speed, and in this way the rotary gear means 6 will be angularly positioned according to the film speed.

The transmission means also includes a pinion 9 which meshes with the rotary gear means 6 so as to be driven thereby, and the pinion 9 is also carried by the camera housing for turning movement. Thus, a pin 10 is fixed to and extends between the walls 2 and 7 and extends through a central aperture of the pinion 9 to support the latter for angular movement. The transmission means further includes a second transmission member, in addition to the transmission member 9, this second transmission member taking the form of a disc 11 in the embodiment of FIG. 1, and this disc 11 is also supported by the pin 10 for turning movement so that the disc 11 also is carried by the camera housing for free turning movement while being coaxial with and turnable with respect to the pinion 9. The common turning axis of the transmission members 9 and 11, which is to say the axis of the pin 10, coincides with the turning axis A—B of the light meter 12. This light meter 12 is simply in the form of a conventional galvanometer which is located in an electrical circuit of an unillustrated photosensitive element such as a photocell or a photosensitive electrical resistor, and the pointer 13 of the meter 12 is capable of indicating the light intensity through a window of the camera housing or may be engaged in a manner well known in the art by a scanning member of a structure for automatically adjusting the diaphragm and/or the exposure time in accordance with the lighting conditions.

An elongated rod 14 also forms part of the transmission means, and this rod 14 is operatively connected to the disc 11 by being fixed therewith as well as operatively connected to the meter 12 by being directly connected thereto at one end of the rod 14, this rod 14 extending through suitable arcuate slots of the walls 1 and 2 so that it is capable of turning through the desired range of angular movement. The rod 14 also extends through an arcuate slot 15 passing through the pinion 9 and extending along a circle whose center is in the axis of the pinion 9, the slots of the walls 1 and 2 through which the rod 14 extends also extending along such a circle, and the rod 14 also extends through a further slot 16 formed in a window 17 which is carried by the bottom wall 7 of the camera, the slot 16 having a length equal to and coinciding with the slots which are formed in the walls 1 and 2. At its bottom end which extends through and beyond the slot 16 the rod 14 has a manually-engageable end portion 18 in the form of a handle which is accessible to the operator.

A manually releasable connecting means, in the form of a manually releasable clutch structure, is provided for maintaining the transmission members 9 and 11 in driving engagement except when the releasable connecting means or clutch is released by the operator. In the embodiment of FIG. 1 the releasable connecting or clutch means takes the form of a releasable detent structure. Thus, the disc 11 is formed with an aperture through which a pin 19 extends, and the disc 11 fixedly carries a leaf spring which presses downwardly on the pin 19, as viewed in FIG. 1, so that in this way the disc 11 carries a spring-pressed pin of the releasable detent structure. The face of the pinion 9 which is directed toward the disc 11 is formed with a plurality of detent recesses 21 which are distributed about the pin 10 so that the spring-pressed pin 19 of the detent structure will be received in one of the recesses 21 for interconnecting the transmission members 9 and 11 so as to maintain them in driving engagement with each other. As is apparent from FIG. 1 the pin 19 has a lower rounded end which is urged by the spring 20 downwardly, in the direction of the arrow a, into one of the detent recesses 21.

At its side surface which is directed toward the window 17, the pinion 9 is provided with a scale 22 of film speeds, and the bottom wall 7 of the camera carries at the exterior of the latter a stationary index 23 which cooperates with the scale 22 in the manner shown most clearly in FIG. 2. In this way there will be an indication at the bottom of the camera of the film speed which has been automatically introduced into the camera when the film means was placed therein. The pinion 9 also carries a second scale 24 which is visible through the window 17, and this scale 24 carries graduations of correction factor values for symbols. For example, these graduations may be filter factors and/or correction factors to make corrections for back-lighting conditions or when exposures are made on particularly dark or cloudy days. According to the graduations of the scale 24, the handle 18 has one end portion 25 which acts as an index and is capable of being aligned with a selected graduation of the scale 24.

With this construction when the films means is introduced into the film-receiving compartment of the camera housing, the actuating portion 4 of the film means will actuate the pin 5 of the transmission means so as to turn the rotary gear means 6 to an angular position determined by the film speed, and because the pinion 9 meshes with the gear 6 the pinion 9 will also turn to an angular position determined by the film speed. Inasmuch as the manually releasable connecting or clutch means maintains the transmission members 9 and 11 in driving engagement with each other, the turning movement of the pinion 9 will be transmitted through the disc 11 to the rod 14, and since the rod 14 turns with the disc 11 and is directly connected to the meter 12 which is coaxial with the transmission members 9 and 11, the meter 12 will also turn so as to be angularly adjusted in this way according to the film speed indicated by the position of the notch 4 of the film means.

Assuming now that it is desired to make an exposure with a filter, then in this case the operator will manually shift the handle 18 until the index 25 thereof is aligned with that graduation of the scale 24 which corresponds to the selected filter. The manual movement of the handle 18 and thus of the rod 14 releases the manually-releasable connecting means simply by overriding the force of the spring-pressed pin 19 which now is manually moved from one recess 21 to the next recess 21, until the graduation of the scale 24 which corresponds to the selected filter is aligned with the index 25 of the handle 18, and in this way the disc 11 will turn relative to and independently of the pinion 9 while the turning of the rod 14 will of course result in angular turning of the light meter 12 so that the latter is angularly adjusted in accordance with an additional correction factor. Inasmuch as the pin 5 is maintained stationary by the actuating portion 4 of the cassette 3 of the film means, the rotary gear 6 and the pinion 9 cannot turn at this time. Thus, the operator need only move the rod 14 and the light meter 12 and the disc 11 in opposition to the spring 20 in order to release the manually-releasable connecting or clutch means, and thus with the structure of the invention it is possible to introduce additional correction factors. It should be noted that inasmuch as the pinion 9 does not move during manual introduction of a correction factor in addition to the film speed, the scale 22 does not move relative to the index 23, so that there is an accurate indication of the speed of the film which is in the camera even after the operator has manually introduced a correction factor in addition to the film speed.

While a direct connection between the rod 14 and the disc 11 as well as the meter 12 is preferred, because of its simplicity and compactness, nevertheless it is possible to provide an indirect connection through suitable transmission elements between the meter 12 and the rod 14 as well as between the disc 11 and the rod 14, if there is sufficient space available in the camera. Thus, it is possible to connect the upper end of the rod 14 to a rotary pinion which turns the meter 12 through a gear train or which meshes directly with a pinion or gear which is coaxially carried by the meter 12. Also, it is possible for the upper end of the rod 14 to extend into a camming groove formed either directly at the underside of the meter 12 or formed in a rotary element which is connected through a suitable gear train to the meter 12, so that in this way also it is possible to angularly adjust the meter 12. With such a construction, which includes a suitable cam means, it is possible to provide an angular movement of the meter 12 which is not the same as the angular movement of the disc 11, and in addition the designer of the camera has a greater freedom of choice in the location of the light meter. Nevertheless, the illustrated construction which is described above is preferred because of its simplicity and compactness, as pointed out above.

Figure 3:
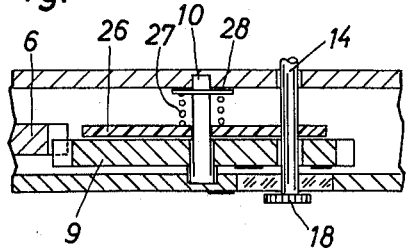
FIG. 3 shows another embodiment of part of the transmission structure of FIG. 1, FIG. 3 also being on an enlarged scale as compared to FIG. 1.

The embodiment of the invention which is illustrated in FIG. 3 is identical with that of FIGS. 1 and 2 except for the construction of the manually-releasable connecting or clutch means. With the embodiment of FIG. 3, instead of a releasable detent structure, a slip clutch structure is used. Thus, as may be seen from FIG. 3, the disc 11 of FIG. 1 is replaced in the embodiment of FIG. 3 by a disc 26 which has its entire lower face, as viewed in FIG. 3, engaging the upper face of the pinion 9. A coil spring 27 extends around the pin 10, engages a washer 28 with its upper end, and with its lower end engages the upper face of the disc 26 so as to urge the latter against the upper face of the pinion 9. Instead of a washer, the element 28 may take the form of a flange which is fixed to the shaft 10. The rod 14 is again directly connected with the disc 26, being fixed to the latter so that the elements 14 and 26 necessarily turn as a unit, and the rod 14 also provides, in the manner described above in connection with FIGS. 1 and 2, the connection to the light meter 12 and to the handle 18. Thus, with the embodiment of FIG. 3 the lower face of the disc 26 and the upper face of the pinion 9 form a slip clutch which is releasably maintained in an engaged position by the spring 27.

With this construction when the film means is introduced into the film-receiving compartment of the camera housing, the rotary gear means 6 will be turned as described above and will thus turn the pinion 9 which through its driving engagement with the disc 26 will turn the rod 14 so as to transmit the movement to the light meter 12 for adjusting the latter in accordance with the film speed.

When it is desired to introduce an additional correction factor, the operator need only move the handle 18 and by overriding the force of the spring 27 the clutch means is manually disengaged with the operator turning the disc 26 independently of and relative to the pinion 9 so that the meter 12 will be manually turned for introducing an additional correction factor as described above. The pinion 9 is of course maintained stationary because the gear 6 cannot turn due to its connection with the actuating portion of the film means, as pointed out above.

It should be noted that the structure of the invention also provides the possibility of making empirical corrections, such as, for example, for the case where due to ageing of the light meter the original calibration thereof is no longer accurate.

Of course, while the structures illustrated in the drawing and described above are preferred, it is also possible to apply the invention to other constructions. For example, in those cameras where the factor of film speed is introduced by shifting a cover element with respect to a window through which light reaches the photosensitive element, it is possible to arrange the structure of the invention so that such a shiftable cover will be shifted automatically according to the film speed and will of course then be manually shifted in order to introduce a further correction factor, so that the principle of the invention is not necessarily limited to an adjustable light meter.

It will be understood that each of the elements described above, or two or more together, may also find a useful application in other types of cameras, differing from the types described above.

While the invention has been illustrated and described as embodied in cameras with adjustable light meters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having a film-receiving compartment; light meter means adjustably carried by said camera housing for adjustable movement to an adjusted position taking into account the speed of the film which is placed in the camera as well as at least one additional correction factor; film means adapted to be received in said compartment of said camera housing and carrying an actuating portion for actuating a transmission means, said actuating portion being indicative of the speed of the film of said film means; transmission means carried by said housing and actuated by said actuating portion of said film means when the latter is placed in said compartment, said transmission means being operatively connected to said light meter means for automatically adjusting the latter by transmitting motion thereto from said actuating portion of said film means so that said light meter means is automatically adjusted in accordance with the speed of the film of said film means, said transmission means including at least a pair of transmission members one of which is moved by said actuating portion of said film means and the other of which transmits movement to said light meter means; and manually releasable connecting means connecting said pair of transmission members to each other for placing said other transmission member in driving engagement with said one transmission member so that the transmission means will transmit movement from said actuating portion of said film means to said light meter means, said manually releasable connecting means when manually released by the operator providing turning movement of said other transmission member relative to and independently of said one transmission member so that the operator can manually change the position of said light meter means to adjust the latter in accordance with said additional correction factor.

2. In a camera, in combination, a camera housing having a film-receiving compartment; light meter means adjustably carried by said camera housing for adjustable movement to an adjusted position taking into account the speed of the film which is placed in the camera as well as at least one additional correction factor; film means adapted to be received in said compartment of said camera housing and carrying an actuating portion for actuating a transmission means, said actuating portion being indicative of the speed of the film of said film means; transmission means carried by said housing and actuated by said actuating portion of said film means when the latter is placed in said compartment, said transmission means being operatively connected to said light meter means for automatically adjusting the latter by transmitting motion thereto from said actuating portion of said film means so that said light meter means is automatically adjusted in accordance with the speed of the film of said film means, said transmission means including at least a pair of transmission members one of which is moved by said actuating portion of said film means and the other of which transmits movement to said light meter means; and manually releasable detent means maintaining said transmission members in driving engagement with each other except when manually released, so that motion is transmitted between said members when said detent means interconnects said transmission members, whereby said detent means may be manually released by the operator to free said other transmission member for movement relative to and independently of said one transmission member for manually adjusting said light meter means in accordance with said additional correction factor.

3. In a camera, in combination, a camera housing having a film-receiving compartment; light meter means adjustably carried by said camera housing for adjustable movement to an adjusted position taking into account the speed of the film which is placed in the camera as well as at least one additional correction factor; film means adapted to be received in said compartment of said camera housing and carrying an actuating portion for actuating a transmission means, said actuating portion being indicative of the speed of the film of said film means; transmission means carried by said housing and actuated by said actuating portion of said film means when the latter is placed in said compartment, said transmission means being operatively connected to said light meter means for automatically adjusting the latter by transmitting motion thereto from said actuating portion of said film means so that said light meter means is automatically adjusted in accordance with the speed of the film of said film means, said transmission means including at least a pair of transmission members one of which is moved by said actuating portion of said film means and the other of which transmits movement to said light meter means; and manually releasable slip clutch means interconnecting said pair of transmission members for maintaining them in driving engagement with each other so that the light meter will be adjusted according to said actuating portion of said film means, whereby when said slip clutch means is manually released said other transmission member may be moved relative to and independently of said one transmission member for transmitting movement to said light meter means for adjusting the latter according to said additional correction factor.

4. In a camera, in combination, a camera housing having a film-receiving compartment; light meter means turnably carried by said camera housing for adjustable turning movement; film means adapted to be received in said compartment and having an actuating portion indicative of the speed of the film of said film means; rotary gear means turnably carried by said housing and actuated by said actuating portion of said film means to be turned when the film means is placed in said compartment to an angular position determined by the speed of the film of said film means; a pinion turnably carried by said camera housing and driven by said rotary gear means; a disc coaxial with and engaging said pinion; an elongated rod operatively connected to said disc for turning movement therewith, said rod having one end operatively connected to said light meter means for turning the latter when said rod turns with said disc and said rod having an opposite, manually-engageable end accessible to the operator; and releasable clutch means maintaining said disc and pinion in driving engagement with each other so that when said film means is placed in said compartment said gear means will transmit a drive from said actuating portion through said pinion and disc to said rod for turning the latter and said light meter means for adjusting the latter according to the film speed, the operator when engaging said manually-engageable end of said rod being capable of turning the latter together with said disc independently of and relative to said pinion while releasing said clutch means so that the angular position of said light meter may be further changed according to an additional correction factor.

5. In a camera as recited in claim 4, said clutch means being in the form of a releasable detent structure.

6. In a camera as recited in claim 4, said releasable clutch means being in the form of a slip clutch formed by surfaces of said pinion and disc which frictionally engage each other.

7. In a camera, in combination, a camera housing having a film-receiving compartment; light meter means turnably carried by said camera housing for adjustable turning movement; film means adapted to be received in said compartment and having an actuating portion indicative of the speed of the film of said film means; rotary gear means turnably carried by said housing and actuated by said actuating portion of said film means to be turned when the film means is placed in said compartment to an angular position determined by the speed of the film of said film means; a pinion turnably carried by said camera housing and driven by said rotary gear means; a disc coaxial with and engaging said pinion; an elongated rod operatively connected to said disc for turning movement therewith, said rod having one end operatively connected to said light meter means for turning the latter when said rod turns with said disc and said rod having an opposite, manually-engageable end accessible to the operator; and releasable clutch means maintaining said disc and pinion in driving engagement with each other so that when said film means is placed in said compartment said gear means will transmit a drive from said actuating portion through said pinion and disc to said rod for turning the latter and said light meter means for adjusting the latter according to the film speed, the operator when engaging said manually-engageable end of said rod being capable of turning the latter together with said disc independently of and relative to said pinion while releasing said clutch means so that the angular position of said light meter may be further changed according to an additional correction factor, the common axis of said pinion and disc coinciding with the turning axis of said light meter and said rod being spaced and extending parallel to said axis and being connected directly to said light meter.

8. In a camera, in combination, a camera housing having a film-receiving compartment; light meter means turnably carried by said camera housing; film means adapted to be received in said compartment and having an actuating portion indicative of the film speed of film of said film means; rotary gear means turnably carried by said housing and actuated by said actuating portion of said film means when the latter is placed in said compartment, said actuating portion of said film means turning said gear means to an angular position determined by the film speed; a pinion driven by said rotary gear means and turnably carried by said housing, said pinion being formed at one of its side faces with a plurality of recesses distributed about the axis of said pinion; a disc engaging said one side face of said pinion and being coaxial therewith and also supported for turning movement by said camera housing, said disc being formed with an opening passing therethrough; a spring-pressed pin carried by said disc and extending through said opening thereof to be received in one of said recesses of said pinion to form a releasable detent structure for releasably maintaining said disc and pinion in driving engagement with each other; and an elongated rod operatively connected to said disc for turning movement therewith and having one end operatively connected to said light meter and an opposite, manually-engageable end accessible to the operator, whereby turning of said gear means will be transmitted to said light meter for adjusting the latter according to the film speed and whereby the operator may engage the manually-engageable end of said rod for turning the latter and said disc with respect to said pinion while releasing said detent structure for manually turning said light meter to introduce correction factors in addition to the film speed.

9. In a camera, in combination, a camera housing having a film-receiving compartment; a light meter turnably carried by said camera housing; film means adapted to be placed in said film-receiving compartment and having an actuating portion which is indicative of the speed of film of said film means; rotary gear means turnably carried by said camera housing and actuated by said actuating portion of said film means when the latter is placed in said compartment, said actuating portion turning said rotary gear means to an angular position which is determined by the speed of the film; a rotary pinion also turnably carried by said camera housing and meshing with said rotary gear means to be driven thereby; a disc carried by said camera housing for free turning movement with respect to said pinion and being coaxial therewith, said disc having a side face engaging a side face of said pinion; spring means urging said disc toward said pinion for maintaining said side faces in frictional engagement with each other, so that said side faces form a friction clutch; and an elongated rod operatively connected to said disc for turning movement therewith, said rod having one end operatively connected to said light meter for transmitting to the latter turning movement of said disc and said rod having an opposite, manually-engageable end accessible to the operator, whereby turning of said gear will be transmitted to said light meter for angularly adjusting the latter according to the film speed and whereby the operator by engaging said manually-engageable end of said rod can turn the latter and said disc during slipping of the slip clutch independently of said pinion for angularly adjusting said light meter to introduce a correction factor in addition to the film speed.

10. In a camera, in combination, a camera housing having a film-receiving compartment; a light meter turnably carried by said camera housing; film means adapted to be received in said compartment and having an actuating portion which is indicative of the film speed; rotary gear means turnably carried by said camera housing and actuated by said actuating portion of said film means when the latter is placed in said housing to be turned to an angular position determined by the film speed; a rotary pinion also turnably carried by said camera housing and meshing with said rotary gear means to be driven thereby; a disc coaxial with and engaging one face of said pinion, said disc being carried by said camera housing for turning movement independently of said pinion; releasable clutch means releasably maintaining said disc and pinion in driving engagement with each other; and elongated rod operatively connected to said disc for turning movement therewith, said rod having one end operatively connected to said light meter means for turning the latter when said disc turns and said rod having an opposite, manually-engageable end accessible to the operator, so that when said film means is placed in the camera said light meter means will be turned to an angular position according to the film speed and so that when the operator manually turns said rod said releasable clutch means will free said disc for turning movement relative to said pinion while the manually turned rod will turn said light meter means to introduce a correction factor in addition to the film speed, and said housing carrying a window through which the face of said pinion opposite to that which is engaged by said disc is visible, said face of said pinion which is visible through said window carrying a scale of film speeds which is visible through said window and said housing carrying at said window an index with which said scale of film speeds cooperates for indicating to the operator the film speed, said pinion also carrying a second scale of values of said correction factor and said second scale also being visible through said window and said manually-engageable end of said rod acting as an index and cooperating with said second scale.

References Cited in the file of this patent
UNITED STATES PATENTS

| | | |
|---|---|---|
| 2,080,055 | Martin | May 11, 1937 |
| 2,186,613 | Mihalyi | Jan. 9, 1940 |
| 2,960,921 | Greger | Nov. 22, 1960 |
| 3,025,777 | Wilkenson | Mar. 20, 1962 |